Patented Apr. 12, 1932

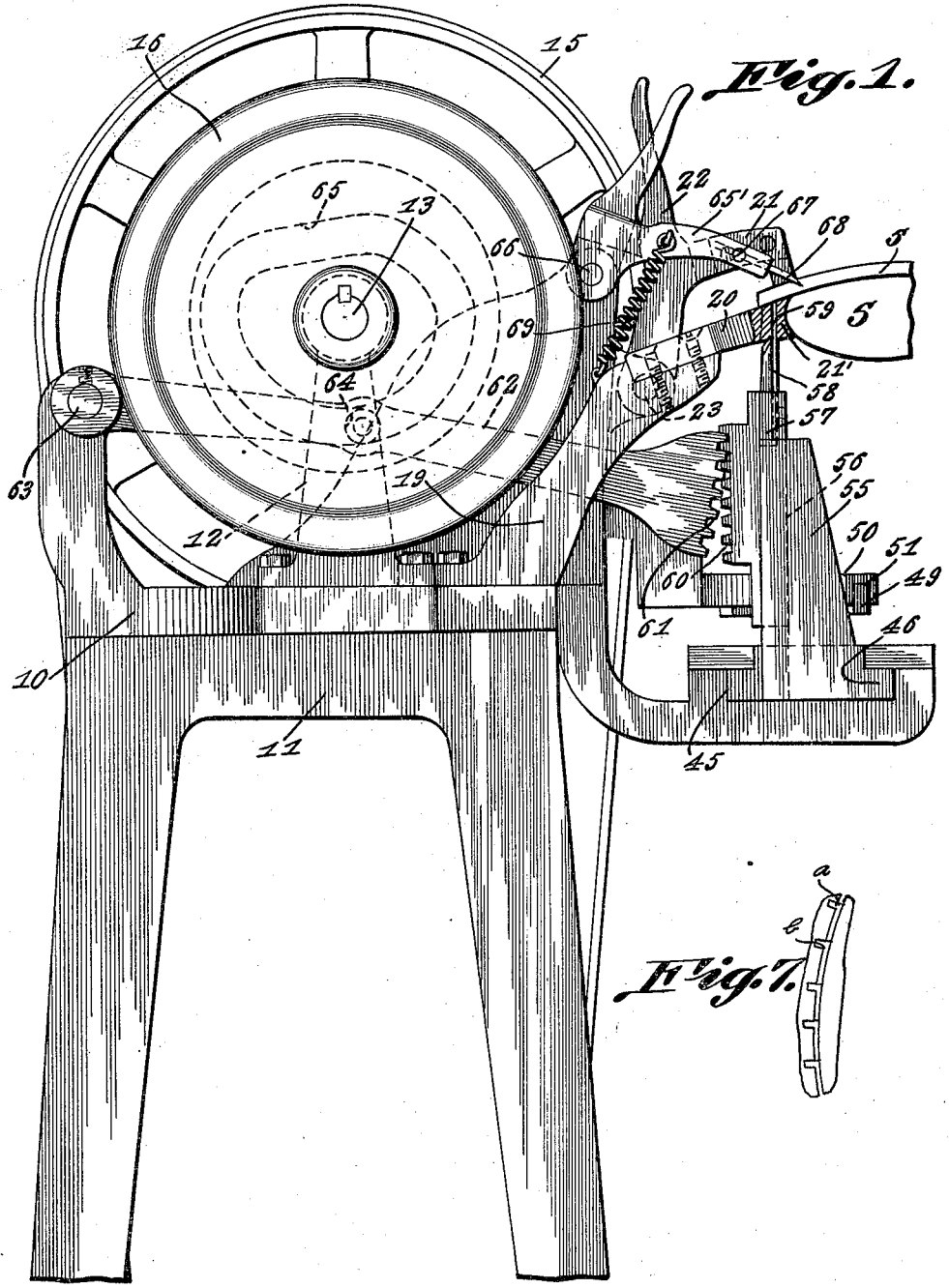

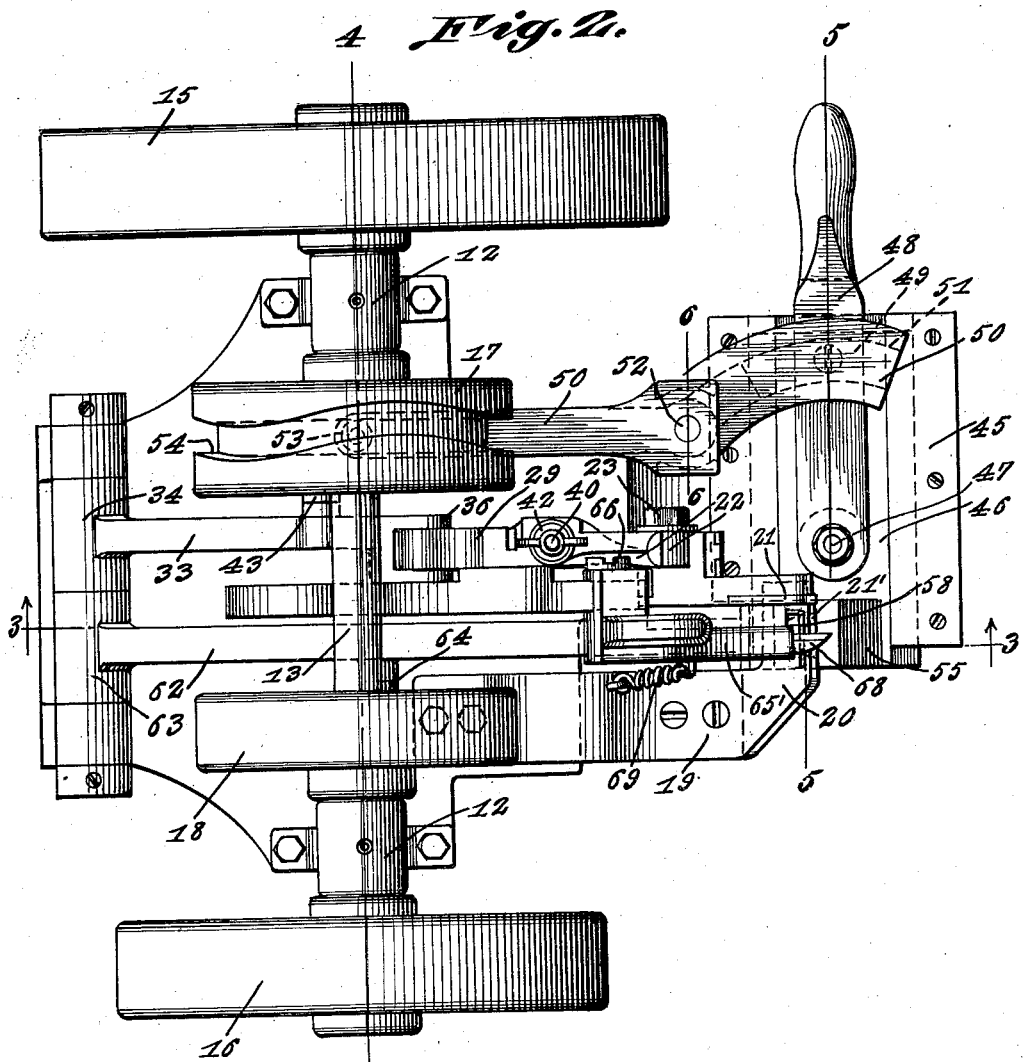
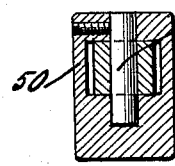

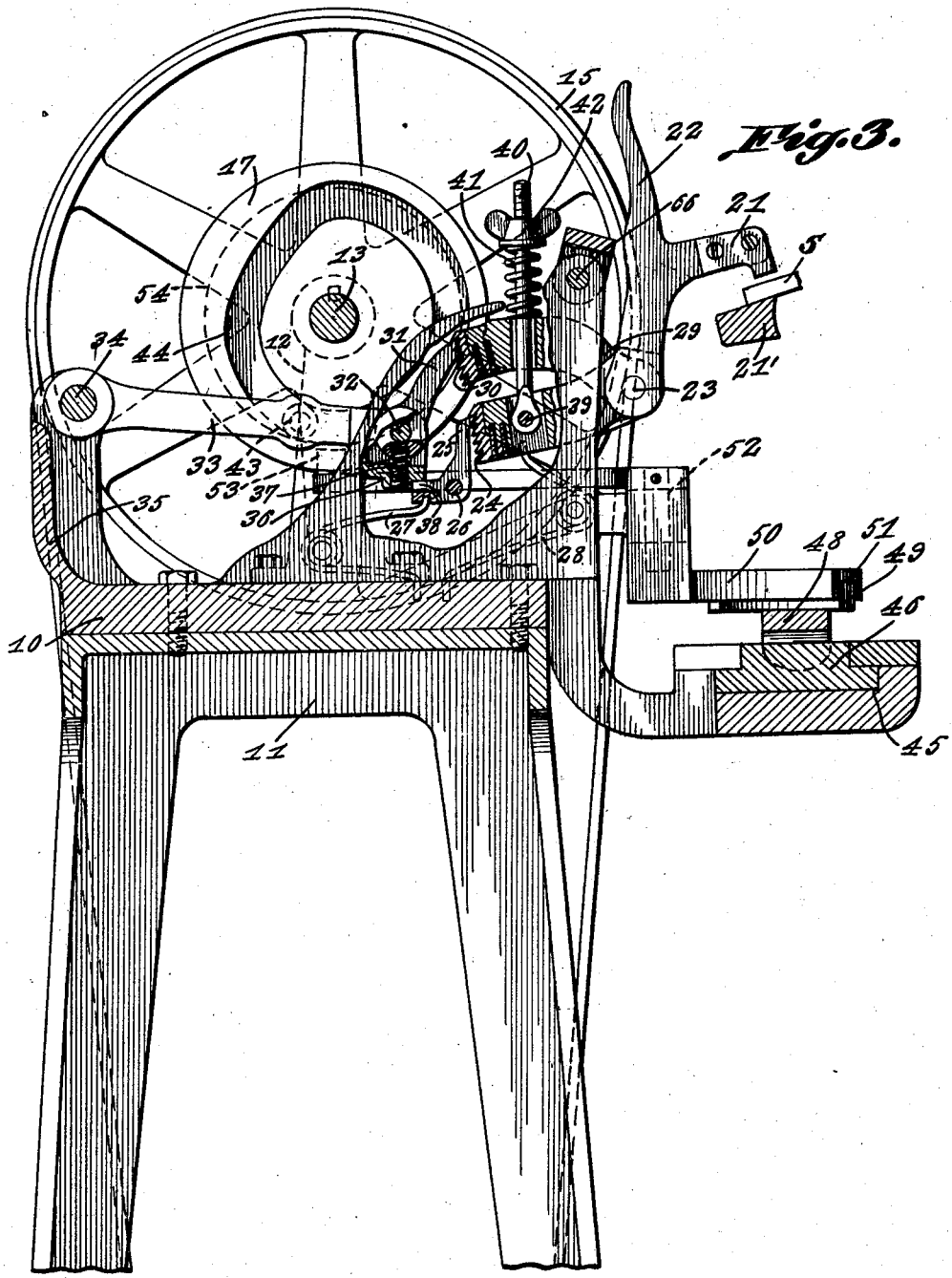

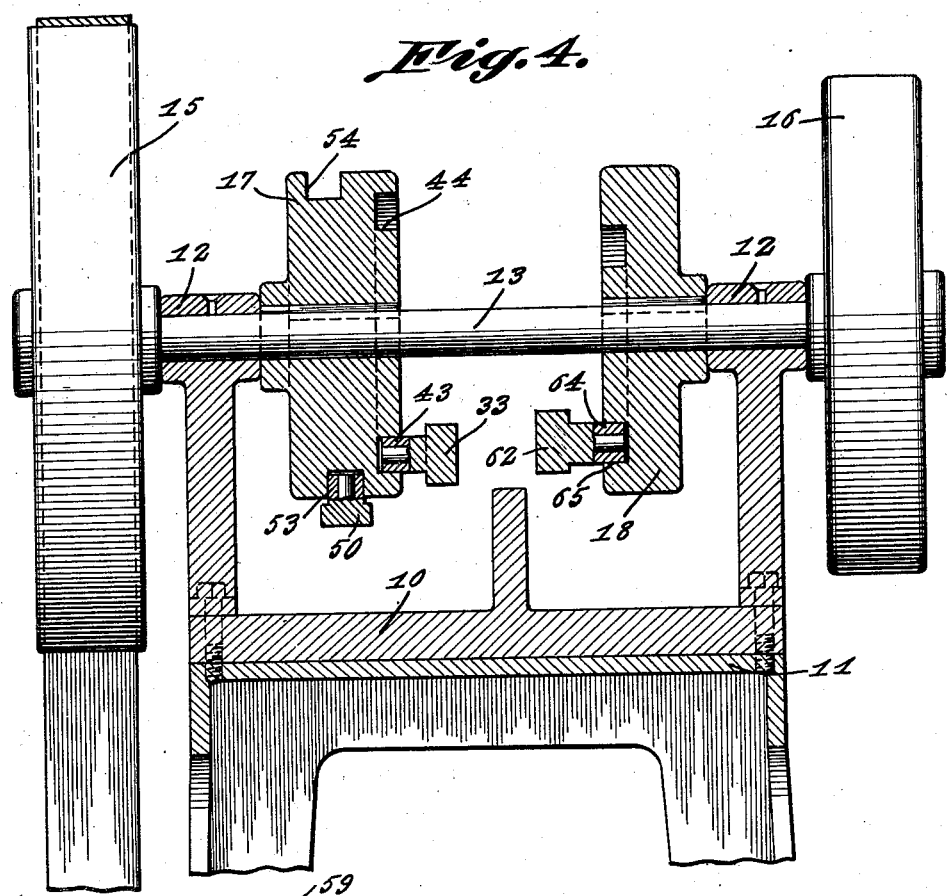
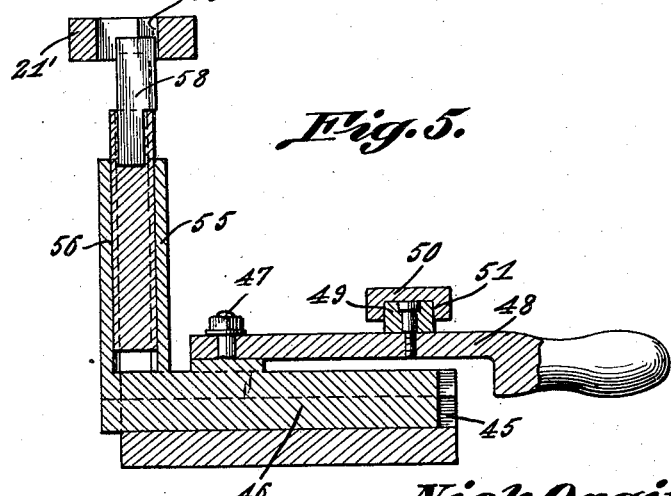

1,853,992

UNITED STATES PATENT OFFICE

NICK ORGITANO, OF LEBANON, PENNSYLVANIA

COMBINED SHOE SOLE CHANNELING AND ROUGH CUTTING MACHINE

Application filed February 28, 1931. Serial No. 519,171.

This invention relates to shoe making machines and has especial relation to "rough rounding" and channeling machines, and has for an object the provision of a machine which will operate to "rough round" a piece of sole leather after the same has been attached to the insole of a boot or shoe, and at the same time cut the necessary channel for welt sewing.

Another object of the invention is the provision of means for automatically clamping the sole in the machine, feeding the knife to cut the sole, releasing the clamping means, and moving the sole a predetermined distance for the next cutting operation.

Another object of the invention is the provision of a machine of the above character which is simple in construction, reliable and efficient in operation, and in which the rounding knife is utilized to impart a step by step movement to the sole.

With the above and other objects in view, the invention further includes the following novel features and details of construction, to be hereinafter more fully described, illustrated in the accompanying drawings and pointed out in the appended claims.

In the drawings:—

Figure 1 is a side elevation of the machine.

Figure 2 is a top plan view.

Figure 3 is a vertical transverse sectional view taken substantially on the line 3—3 of Figure 2, parts being broken away.

Figures 4, 5 and 6 are sectional views taken respectively on the lines 4—4, 5—5 and 6—6 of Figure 2.

Figure 7 is a diagrammatic view illustrating the cut.

Referring to the drawings in detail wherein like characters of reference denote corresponding parts, the reference character 10 indicates a table which is mounted upon a supporting stand 11.

Mounted in suitable bearing standards 12 which extend upwardly from the table is a shaft 13 and secured to opposite ends of this shaft are fly wheels 15 and 16, while also mounted upon this shaft are cams 17 and 18. The cam 17 will be hereinafter referred to as the slide cam, while the cam 18 may be termed the lift cam.

Extending upwardly through the table 10 is a rigid arm 19. This arm includes an outer section 20 of steel or other hard metal and defines a sole supporting arm having a lateral extension 21' whose outer face is inclined and transversely grooved for engagement by the toe of a shoe indicated at S in Figure 1 of the drawings. The sole s of the shoe is designed to extend over the upper edge of the arm 20 and to be clamped thereon by means of a presser arm 21 which extends from a presser arm lever 22. This lever is pivotally mounted as shown at 23 and its inner end has removably secured thereto a hard metal toothed extremity 24 which is adapted to be engaged by a holding dog 25. This dog is pivotally mounted as at 26 and is yieldingly forced into engagement with the teeth of the extremity 24 through the medium of a spring 27. A spring 28 has one of its ends anchored in the table 10 and its opposite end engaged with the inner end of the presser arm lever 22 so as to yieldingly force the upper end of the presser arm lever outward to engage the presser arm 21 with the work.

Also pivotally mounted as indicated at 23 is an arm 29 and this arm is provided with a hard metal toothed extremity 30 which is engaged by a working dog 31, the latter being pivotally mounted as shown at 32 upon an operating lever 33. This lever is in turn pivotally mounted as shown at 34 upon a bracket 35 which rises from the table 10. The arm 33 carries an offset portion 36 which carries a spring 37, the latter acting to yieldingly force the dog 31 into engagement with the end of the lever 29. This offset extremity 36 of the lever 33 is adapted to engage an arm 38 which is rigid with the dog 25 for the purpose of releasing this dog from the inner end of the arm 22.

Pivotally secured to the arm 22 adjacent its inner end as shown at 39 is one end of a rod 40 and this rod extends upward through an opening provided in the arm 29 and carries a spring 41. One end of this spring bears against the upper edge of the arm 29 and the opposite end bears against an adjusting nut 42, by means of which the tension of the spring may be regulated.

The operating lever 33 carries a laterally extending roller 43 which operates in a groove 44 provided in one face of the cam 17. With the parts in the position shown in Figure 3, the presser arm 21 is spaced above the sole s so that the latter may be moved upon the arm 20. Rotation of the cam 17 will lift the operating lever 33 and cause the working dog 31 to force the arm 29 upward, and as the inner end of the lever 22 is connected with this arm 29 through the rod 40, the inner end of this presser arm lever will be likewise moved upward to force the arm 21 into clamping engagement with the sole s. The spring 41 acts to compensate for excess movement of the presser arm lever 22, and pressure of this arm upon the sole may be regulated by adjusting the tension of the spring.

Continued rotation of the cam 17 will move the operating lever 33 pivotally downward, the dog 25 serving to hold the presser arm lever against downward movement until the operating lever 33 reaches its limit of downward movement, whereupon the offset portion 36 of the lever 33 strikes the arm 38 of the dog 25 and releases the dog from engagement with the lever 22. This operation is repeated during the rotary movement of the cam 18 so that the presser arm lever 22 is alternately moved into and out of gripping position.

Extending outward from the table 10 is a guide 45 which accommodates a horizontally movable slide 46. This slide has pivotally attached thereto as shown at 47, one end of a hand lever 48. Secured transversely to this lever is an arcuate block 49 which is engaged by the outer end of a lever 50, the said lever being provided in its under face with a groove 51 for that purpose. The lever 50 is pivotally mounted as shown at 52 and the inner end of this lever carries a roller 53 which operates in a cam groove 54 which extends around the periphery of the slide cam 17.

When the cam 17 is rotated, the arm 50 will be moved upon its pivot 52 and through the engagement of the outer end of this arm with the arcuate block 49, the slide 46 will be reciprocated.

Extending upwardly from one end of the slide 46 is a knife guide block 55. This block is provided with a vertically extending dovetailed guide groove 56 which accommodates a knife block 57. Removably secured within the upper end of this block is a transversely angular knife 58 which operates through a similarly shaped opening 59 provided in the extension 21' of the arm 20. One end of this opening is of sufficient size to permit the knife to move horizontally in a direction transverse of the block 20, this movement being coextensive with the movement of the slide 46.

The block 57 is toothed along one edge as shown at 60 and these teeth are engaged by the teeth 61 at one end of the lever 62. This lever is pivotally mounted as at 63 and carries a laterally extending roller 64 which operates in a cam groove 65 provided in the lifting cam 18.

When the cam 18 is rotated, the lever 62 will be moved pivotally to alternately raise and lower the knife block 57.

In the operation of the machine, the toe of the shoe is adjusted to the arm 20 with the extended portion of the sole extending over the upper edge of this arm, the particular point of contact between the toe of the shoe and the arm 20 depending upon the amount to be cut from the sole. In other words, as the outer face of the arm 20 is inclined with respect to the position of the knife 58, the position of the toe along this inclined edge will determine the amount of the sole which extends over the slot 59. As the shaft 13 rotates, the presser arm will be moved downward into gripping engagement with the sole as previously described, whereupon, the arm 62 will operate to force the knife 58 upward through the sole and will make an L-shaped cut in the edge of the sole as shown at a in Figure 7 of the drawings. At this point, the presser arm will release the sole and the slide 46 will be moved to advance the sole a distance equal to the length of the cut. The presser arm will again grip the sole and the knife, through the movement of the slide 46, will return to its initial position and will be again moved upward for the next cut b. A step by step movement will thus be imparted to the sole and the operation will be repeated at each step.

In addition, the invention provides a substantially L-shaped arm 65' which is pivotally mounted as shown at 66. The outer end of this arm 65' has removably secured thereto as shown at 67, a channeling knife 68. A spring 69 forces this knife into the sole, so that as the sole is moved step by step, a channel will be cut in the under face of the sole. The spring 69 has one end secured to the arm 19 and its opposite end secured to the arm 65' in such a way that when the arm 65' is moved upon its pivot 66, the knife 68 will be either held in position to engage the sole, or will be maintained in elevated position.

This invention is susceptible of various changes in its form, proportions and minor details of construction and the right is herein reserved to make such changes as properly fall within the scope of the appended claims.

Having described the invention what is claimed is:—

1. In a rough rounding machine, a stationary sole engaging arm, a movable presser arm adapted to engage and clamp the sole upon the stationary arm, a vertically and horizontally movable rounding knife, means to operate the knife to alternately cut and move the sole, and means to operate the presser arm to clamp the sole in cutting position, said presser arm operating means including a pivotally mounted presser arm lever having the presser arm extending rigidly therefrom, a pivotally mounted controlling arm, means connecting the lever and pivotally mounted arm to resist relative downward movement, a pivotally mounted operating lever, means to move said operating lever pivotally, means carried by the operating lever and engaging the controlling arm to move the lever pivotally in one direction, and means controlled by the operating lever to hold the presser arm lever against accidental retrograde movement.

2. In a rough rounding machine, a table, a stationary sole engaging arm supported thereby, a presser arm lever supported for pivotal movement above the table, a presser arm disposed above the stationary arm and rigid with said lever and cooperating with the stationary arm to grip the sole, a rotary drive shaft, a slide cam and a lift cam carried by said shaft, means to operate the presser arm to intermittently grip and release the sole including a pivoted operating lever actuated by the slide cam, a horizontally disposed reciprocatory slide, a vertically disposed knife block guide rigid with the slide, a block movable vertically in the guide, a knife carried by the block, a lever to move the block vertically in opposite directions to cut the sole actuated from the lift cam, and means actuated from the slide cam to reciprocate the slide to move the knife horizontally and impart a step by step movement to the sole in timed relation to operation of the presser arm.

In testimony whereof I affix my signature.

NICK ORGITANO.